Patented Jan. 5, 1932

1,839,257

UNITED STATES PATENT OFFICE

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

VALVE CONTROL SYSTEM

Application filed September 14, 1929. Serial No. 392,550.

This invention relates to fluid control systems, and more particularly of the hydraulic type. In its more specific form it relates to the control of hydraulic turbines and the like, and it will be described as a matter of convenience in this connection.

In the control of hydraulic turbines it is necessary to control the flow of water to the turbine. Control of the water flowing in the conduit supplying the turbine may give rise to abnormal pressure conditions in the conduit. This is particularly true if it is attempted to rapidly change the amount of water flowing. It is one of the objects of the invention to obviate this disadvantage in an improved manner.

Moreover in governor controlled turbines, as the load varies on the turbine it is desirable in order to keep the speed constant to vary the supply of water to the turbine in accordance with rapid load changes. This necessitates a fast acting governor. There is accordingly danger that excessive positive or negative pressures may be developed. It is therefore a further object of the invention to provide an improved system which will permit the utilization of a normally fast acting governor with resultant better speed regulation, while avoiding the dangers of abnormal pressure conditions.

A more specific object is the provision of a governor which is normally comparatively fast acting and which is directly controlled in response to pressure conditions in the conduit which it controls so that its speed of operation will vary in accordance with the pressure conditions in said conduit.

Another object is the provision of a fluid control system in which the means for controlling the flow of fluid is caused to move at a speed controlled both by the pressure of the fluid controlled and by the position of the fluid controlling means.

Other objects will appear hereinafter as the description of the invention proceeds.

The novel features of the invention will appear from this specification and the accompanying drawings forming a part thereof and illustrating one embodiment of the invention and all these novel features are intended to be pointed out in the claims.

Fig. 1 of the drawings illustrates in diagrammatic form one embodiment of the invention as it may be applied in connection with the control of a hydraulic turbine.

Figures 1, 2:
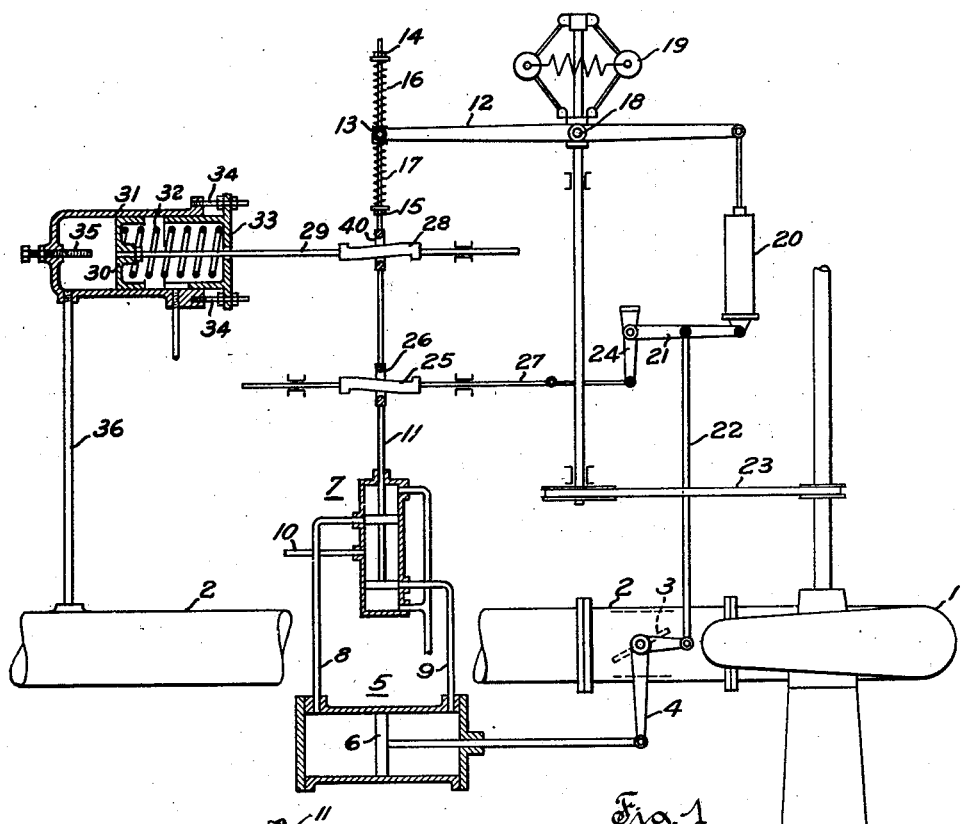
Fig. 2 is an elevation of a detail of Fig. 1.

Referring to Fig. 1 of the drawings, a turbine 1 is shown as supplied with operating fluid through a conduit 2. The flow of fluid through this conduit may be controlled in any suitable manner, the means here shown being a valve 3. Hereinafter the term "gate" will be used to designate any means for controlling the supply of fluid. The gate may be swung by means of a crank 4 operatively connected to a servo-motor 5 having a piston 6. The servo-motor may be controlled by means of a regulating valve 7 which in turn controls fluid under pressure which may enter one or the other end of a cylinder in which the piston 6 is disposed, through pipes 8 or 9. Fluid under pressure may be supplied from any suitable source to the regulating valve through a pipe 10. The regulating valve has a stem 11 which is connected in the instance shown to a floating lever 12 through a swivel connection 13. The valve stem passes freely through the swivel connection and is positioned by means of nuts 14 and 15 cooperating with springs 16 and 17 so that it is possible for the floating lever 12 to move the valve stem 11 up and down and also the valve stem 11 may be limited in its motion, as will hereinafter appear, while the floating lever 12 moves and compresses either one or the other of the springs 16, 17.

The floating lever 12 is mounted on a floating pivot 18 the position of which depends upon a centrifugal device here shown as the flyballs 19. The other end of the floating lever 12 is connected to one member of a dash pot 20, or compensating device, the other member of the dash pot being suitably connected to a lever 21 which latter is in turn connected by a rod 22 through any suitable means as a crank, to the shaft of the gate 3, so that the rod 22 will be moved in unison with the gate and a motor which operates the same. The flyballs may be driven in any suitable manner as by means of a belt 23.

Motion may be transmitted from the gate through a lever 24, here shown as moving in unison with lever 21, to a cam 25 which is here shown as passing through a hole 26 in an enlargement in the valve stem 11. The cam 25 may be carried by a rod 27 in suitable guides.

Another cam 28 is provided which passes through a hole 40 in an enlarged portion of the valve stem 11, this cam being carried in a suitable guide on a rod 29, which in the instance shown also serves as a rod for a piston 30 disposed in a cylinder 31. The piston 30 is normally biased toward the left as viewed in Fig. 1 by a spring 32 disposed between said piston and a head 33. The head 33 may be adjusted as by means of the screws 34 to vary the position of cam 28. The other end of the cylinder 31 may be provided with an adjustable stop 35. The cylinder 31 is here shown as connected by means of a pipe 36 to the conduit 2 on the upstream side of the gate 3.

Referring now to Fig. 2, the cam 28, here shown in enlarged detail, has an upper cam surface 39 and a lower cam surface 41. It will be noted that in the position shown the valve stem 11 may be dropped an amount $y_2$ and may be lifted an amount $y_5$. If the cam 28 is moved to its full limit of travel to the left, the valve stem 11 may be dropped no more than an amount $y_1$ but may be lifted, in the instance shown, a greater amount $y_4$. In a similar manner, if the cam 28 is moved to the limit of its travel towards the right the valve stem 11 may be dropped an amount $y_3$ and lifted an amount $y_6$, the valve drop being in the instance shown greater than the valve lift. It is obvious that the possible valve drops and lifts will be limited for every position of the cam 28 in accordance with the character of the cam surfaces 39, 41.

The cam 25 is also shown in enlarged detail in Fig. 2 and in the position shown the possible valve drop and valve lift are respectively $x_2$ and $x_5$. When the cam 25 is at its lefthand limiting position the valve drop and valve lift are respectively $x_3$ and $x_6$. In the righthand limiting position the valve drop and lift are respectively $x_1$ and $x_4$. Similarly to cam 28 the possible valve drops and valve lifts for any position of cam 25 are limited by upper and lower cam surfaces 42 and 43 respectively of that cam.

Figure 3:
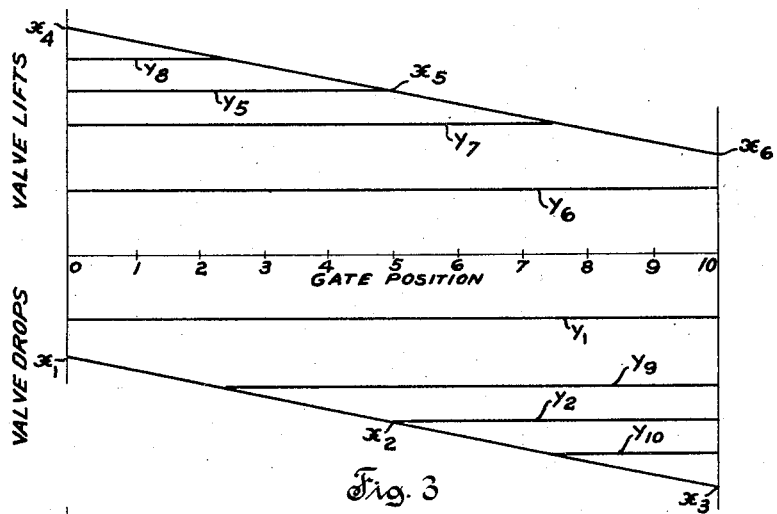
Fig. 3 is a diagram showing possible control valve lifts and drops.

The possible valve lifts and drops for a number of different combinations are qualitatively illustrated in Fig. 3. In this figure the horizontal axis represents the position of the gate 3, the numerals indicating tenths of full gate opening, whereas the ordinates above the horizontal axis indicate valve lifts and those below said axis the valve drops. Thus the ordinates of the curve $x_4$, $x_5$, $x_6$ represent, qualitatively, the valve lifts permitted by the cam surface 43 and the curve $x_1$, $x_2$, $x_3$ represents the possible valve drops permitted by the cam surface 42. If the pressure in conduit 2 is such as to position the cam 28 as shown in Fig. 2 then the cam surface 41 will limit the possible valve lift to the amount $y_5$ so that, in case $x_5$ and $y_5$ are equal, the possible valve lift between the gate positions zero to five is equal to the ordinates of the curve $y_5$ on Fig. 3. In like manner if the possible valve drop $y_2$ is equal to the possible valve drop $x_2$ then the possible valve drop between the gate positions 5 and 10 will be indicated by the negative ordinates of the curve $y_2$ in Fig. 3.

The operation of the system is as follows. Let it be assumed that the gate 3 is fully open instead of approximately half open as indicated in Fig. 1. In that case the rod 22 will have caused the cam 25 to move to its limiting position toward the left in which case the possible valve lift is $x_6$. Let it also be assumed that the system is operating under normal pressure in the conduit 2 so that the piston 30 has compressed the spring 31 to such an extent that the cam 28 is in the position shown in Fig. 2. Now let it be assumed that the load on the turbine 1 is removed thereby causing the flyballs 19 to lift the valve stem 11 to its fullest possible extent, that is, an amount $x_6$. The regulating valve 7 thereby permits fluid under pressure to enter the cylinder of the servo-motor through pipe 8 thereby applying force to the gate 3 to move it toward closed position. As soon as the servo-motor moves, the dash pot or compensating device 20 readjusts the floating lever 12 to prevent hunting of the governing mechanism in the usual manner. As long however as the flyballs 19 tend to lift the valve stem 11 out of its neutral position the piston 6 will be caused to move toward the closed position of gate 3, the lower surface of hole 26 in valve stem 11 being lifted against cam surface 43. As the gate 3 moves toward closed position the valve stem is permitted to be lifted by the flyballs 19 a greater and greater extent so that the valve lifts follow the curve $x_6$ to $x_5$. If the pressure in the conduit 2 has remained the same while the gate thus moves from the fully open to the half open position the possible valve lift instead of increasing along the curve $x_5$ to $x_4$ will now be limited in accordance with the curve $y_5$, that is, the valve lift remains constant if the pressure remains constant inasmuch as the cam 41, in the position shown in Fig. 2, permits no greater lift than $y_5$. If the pressure in conduit 2 is caused to increase by reason of the closing movement of gate 3 so that the piston 30 is forced toward the right to its full extent, the possible valve lift is at once reduced as indicated by the curve $y_6$. Thus under these conditions the upward movement of valve stem 11 is limited by the lower surface of the hole 40 coming in contact with the cam 41. The same is true for any intermediate position of the cam 28 as for example represented by the possible valve lift $y_7$.

In case the pressure in the conduit 2 is less than that represented by valve lift $y_5$, the possible valve lifts will be represented by the ordinates of the curve $x_6$, $x_5$ to the point where the curve $y_8$ for example cuts said curve.

Figure 4:
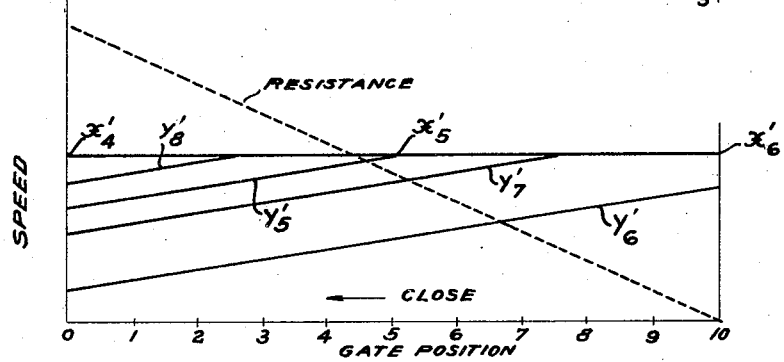
Figs. 4 and 5 are diagrams illustrating possible modes of operation of the system during closure and opening of the valve respectively.

If the gate which is controlled is of the type in which the resistance to closure increases as the gate is moved toward closed position, the speed of closure of the gate will be represented by the curves in Fig. 4. In this curve the resistance to closure of the gate is indicated by the dotted line. Assuming again that the gate is fully open, the possible valve lift being $x_6$ and the pressure being such that the cam 28 is in the position shown in Fig. 2, the speed of the gate will be represented by the ordinates of the curve $x'_6$, $x'_5$, $y'_5$. It will be noted that the speed is constant for the motion from position 10 to position 5 and slowly decreases from position 5 to position zero. In like manner the speed curve $y'_6$ represents that which would be produced by the valve lift $y_6$. Analogously the other speed curves are given primed reference characters corresponding to the valve lifts of Fig. 3. It will be obvious that the nature of the speed-gate position curve will, with the cams illustrated, vary as the gate position and possible pressure in the conduit 2 vary. Obviously, there are an infinite number of speed-gate position curves, and those here given are merely special instances by way of illustration. Moreover, in case the gate which is controlled is in the form of a nozzle for an impulse turbine, for instance, the form of the cams 25 and 28 will be different inasmuch as the resistance curve for a nozzle is substantially the reverse of that for the gates of a Francis turbine, for example, that is, as the gate is moved toward the closed position the resistance toward closure decreases. It will be obvious that by properly shaping the cams 25 and 28 any desired form of speed-gate position curves may be obtained which will satisfy the conditions under which the gate is to operate.

Figure 5:
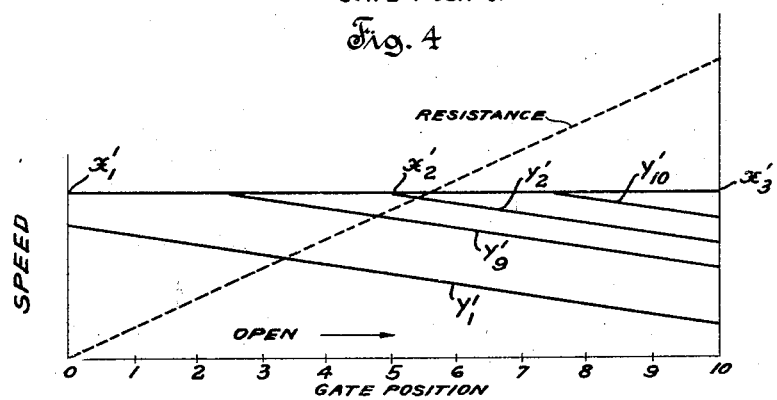

Hereinbefore the operation has been considered with reference only to the closure of the gate. The operation with reference to opening of the gate is quite analogous except that as is well known to those skilled in the art this operation may cause a decrease in pressure in the conduit 2 below normal. Such negative pressures are to be guarded against as well as pressures above normal. In Fig. 5 are illustrated a few representative speed-gate position curves which may be obtained in case the gate is such that the resistance toward opening increases as the gate is opened. In this figure the speed curves are indicated by primed reference characters corresponding to the valve drops in Fig. 3. Thus, if the gate is closed, the cam 25 being then in its limiting position toward the right, and the valve stem 11 is dropped to cause opening of the gate, the valve drop curve $x_1$, $x_2$ will result in a constant speed curve $x'_1$, $x'_2$, from there on the valve drop being $y_2$ resulting in a falling speed curve $y'_2$. If the pressure decreases below normal to an extent such that valve drops such as $y_9$ or $y_1$ are only permissible, the speed curve will be given by the lines $y'_9$ and $y'_1$ respectively. The speed of opening of the gate 3 is thus automatically adjusted so as to prevent excessive negative pressure, just as hereinbefore described the speed of closure is adjusted to prevent excessive positive pressure.

It will be clear that the speed curves will not necessarily be straight lines, as these have been indicated merely for the sake of convenience, but by reason of the varying positions of the cams 25 and 28 may be any suitable curves which will take care of the conditions to be met.

It will be obvious that if the cam surfaces 41 and 39 are made horizontal for a predetermined distance in the middle for example that the pressure may vary within predetermined limits either above or below normal without producing any change in the possible valve lifts and drops as far as this cam is concerned. In general, from what has been previously stated it will be obvious that the shape of cams 25 and 28 as shown in Fig. 2 is merely illustrative and any desired shapes come within the scope of the invention.

It should be understood that it is not desired to limit the invention to the exact details of description shown and described for obvious modifications may occur to persons skilled in the art.

It is claimed and desired to secure by Letters Patent:

1. In combination, a conduit for liquid, a gate in said conduit, means for operating said gate, means responsive to predetermined pressure in said conduit for controlling said operating means, and means for also controlling said operating means to produce varying predetermined effects thereon in accordance with the position of said gate.

2. In combination, a conduit for liquid, a gate in said conduit, means for operating said gate, means for controlling said operating means to operate said gate at a predetermined maximum speed, means responsive to pressure in said conduit for causing said controlling means to control the speed of said gate inversely in accordance with increase in pressure, and means for controlling said operating-control means to produce varying predetermined effects thereon in accordance with the position of said gate.

3. In combination, a conduit for liquid, a gate in said conduit, means for operating said gate, means for controlling said operating means to operate said gate at a predetermined maximum speed, means responsive to pressure in said conduit for causing said controlling means to control the speed of said gate inversely in accordance with decrease in pressure, and means for controlling said operating-control means to produce varying predetermined effects thereon in accordance with the position of said gate.

4. In combination, a conduit for liquid, a gate in said conduit, means for operating said gate, means for controlling said operating means to operate said gate at a predetermined maximum speed, means responsive to pressure in said conduit for causing said controlling means to control the speed of said gate inversely in accordance with increase and decrease in pressure above and below a predetermined range, and means for controlling said operating-control means to produce varying predetermined effects thereon in accordance with the position of said gate.

5. In a prime mover control system, a conduit for supplying said prime mover with operating fluid, a gate in said conduit, a servo-motor for operating said gate, a regulating valve for said servo-motor, means responsive to pressure in said conduit for altering the effect of said regulating valve on said servo-motor, and means for controlling said regulating valve to produce varying predetermined effects thereon in accordance with the position of said gate.

6. In a prime mover control system, a conduit for supplying said prime mover with operating fluid, a gate in said conduit, a servo-motor for operating said gate, a regulating valve for said servo-motor, means responsive to the speed of said prime mover for controlling said regulating valve, means responsive to the pressure in said conduit for altering the effect of said regulating valve on said servo-motor, and means for controlling said regulating valve to produce varying predetermined effects thereon in accordance with the position of said gate.

7. In combination, a conduit for fluid, a gate in said conduit, means for operating said gate, means adjustable to different positions to a predetermined limit for controlling said operating means to cause said operating means to move at a rate dependent upon the position of said movable means, and means responsive to the pressure in said conduit for controlling said predetermined limit.

8. In a prime mover control system, a conduit for supplying operating liquid to said prime mover, a gate in said conduit, means for operating said gate, means adjustable to different positions to a predetermined limit for controlling said operating means to cause said operating means to move at a rate dependent upon the position of said movable means, means responsive to the speed of said prime mover for controlling said movable means, and means responsive to the pressure in said conduit for controlling said predetermined limit.

9. In a prime mover control system, a conduit for supplying operating liquid to said prime mover, a gate in said conduit, a servo-motor for operating said gate, a regulating valve adjustable to different positions to a predetermined limit for controlling said servo-motor to cause said servo-motor to move at a rate dependent upon the position of said regulating valve, and means responsive to the pressure in said conduit for controlling said predetermined limit.

10. In a prime mover control system, a conduit for supplying operating liquid to said prime mover, a gate in said conduit, a servo-motor for operating said gate, a regulating valve adjustable to different positions to a predetermined limit for controlling said servo-motor to cause said servo-motor to move at a rate dependent upon the position of said regulating valve, means responsive to the speed of said prime mover for controlling said regulating valve, and means responsive to the pressure in said conduit for controlling said predetermined limit.

11. In a prime mover control system, a conduit for supplying operating liquid to said prime mover, a gate in said conduit, a servo-motor for operating said gate, a regulating valve adjustable to different positions to a predetermined limit for controlling said servo-motor to cause said servo-motor to move at a rate dependent upon the position of said regulating valve, and means including a cam operatively related to said regulating valve whose position is dependent on the pressure in said conduit for controlling said predetermined limit.

12. In a prime mover control system, a conduit for supplying operating liquid to said prime mover, a gate in said conduit, a servo-motor for operating said gate, a regulating valve adjustable to different positions to a predetermined limit for controlling said servo-motor to cause said servo-motor to move at a rate dependent upon the position of said regulating valve, means responsive to the speed of said prime mover for controlling said regulating valve, and means including a cam operatively related to said regulating valve whose position is dependent on the pressure in said conduit for controlling said predetermined limit.

13. In combination, a conduit for fluid, a gate in said conduit, means for operating said gate, and means whereby said operating means may be caused to move said gate through a predetermined position at a speed dependent upon the position of said gate and upon the pressure in said conduit.

14. In combination, a conduit for fluid, a gate in said conduit, means for operating said gate, and means whereby said operating means may be caused to move said gate through a predetermined position at a speed dependent upon the position of said gate, the pressure in said conduit, and the direction in which said position is traversed.

15. In a prime mover control system, a conduit for supplying operating fluid to said prime mover, a gate in said conduit, means for operating said gate and means whereby said operating means may be caused to move said gate through a predetermined position at a speed dependent upon the position of said gate and upon the pressure in said conduit, and the degree of speed change of said prime mover.

16. In a prime mover control system, a conduit for supplying operating fluid to said prime mover, a gate in said conduit, means for operating said gate, and means whereby said operating means may be caused to move said gate through a predetermined position at a speed dependent upon the position of said gate, the pressure in said conduit, the direction in which said position is traversed, and the degree of speed change of said prime mover.

17. In a prime mover control system, a conduit for supplying operating fluid to said prime mover, a gate in said conduit, a servo-motor for operating said gate, a regulating valve for controlling said servo-motor, a stem for said regulating valve, said stem having shoulders thereon, a cam disposed between said shoulders and movable transversely of said stem, and means responsive to the pressure in said conduit for positioning said cam.

18. In a prime mover control system, a conduit for supplying operating fluid to said prime mover, a gate in said conduit, a servo-motor for operating said gate, a regulating valve for controlling said servo-motor, a stem for said regulating valve, said stem having shoulders thereon, a cam disposed between said shoulders and movable transversely of said stem, means responsive to the speed of said prime mover, a lost motion resilient connection between said speed responsive means and said regulating valve stem, and means responsive to the pressure in said conduit for positioning said cam.

19. In a prime mover control system, a conduit for supplying operating fluid to said prime mover, a gate in said conduit, a servo-motor for operating said gate, a regulating valve for controlling said servo-motor, a stem for said regulating valve, said stem having shoulders thereon, a cam disposed between said shoulders and movable transversely of said stem, means responsive to the pressure in said conduit for positioning said cam, said regulating valve stem having a second set of shoulders, a second cam disposed between said second set of shoulders and movable transversely of said stem and a connection between said second cam and said gate.

20. In combination, a conduit for liquid, a gate in said conduit, means for operating said gate, means for controlling said operating means to operate said gate at a predetermined maximum speed in the closing direction, and means responsive to pressure in said conduit for causing said controlling means to control the speed of said gate inversely in accordance with increase in pressure above normal, and inversely in accordance with decrease in pressure below normal.

21. In combination, a conduit for liquid, a gate in said conduit, means for operating said gate, means for controlling said operating means to operate said gate at a predetermined maximum speed in the opening direction, and means responsive to pressure in said conduit for causing said controlling means to control the speed of said gate directly in accordance with decrease in pressure below normal and directly in accordance with increase in pressure above normal.

In testimony whereof, the signature of the inventor is affixed hereto.

ARNOLD PFAU.